United States Patent [19]

Takanashi et al.

[11] Patent Number: 4,862,255
[45] Date of Patent: Aug. 29, 1989

[54] COLOR CORRECTING CIRCUIT FOR THERMAL PRINTER SELECTIVELY OUTPUTTING A SECOND DEGREE CORRECTION OPERATION RESULT AND A MODIFIED RESULT THEREOF

[75] Inventors: Itsuo Takanashi, Kamakura; Hideshi Tanaka, Yokohama; Terumi Ohara, Yokohama; Kenichi Miyazaki, Yokohama; Toshinori Takahashi, Kawasaki; Hiroki Kitamura, Tokyo; Tadao Shinya; Yutaka Mizoguchi, both of Yokohama, all of Japan

[73] Assignee: Victor Company of Japan, Ltd., Japan

[21] Appl. No.: 129,046

[22] Filed: Dec. 7, 1987

[30] Foreign Application Priority Data

Dec. 16, 1986 [JP] Japan ................... 61-299150

[51] Int. Cl.⁴ .................... G03F 3/08; H04N 1/46
[52] U.S. Cl. .......................... 358/80; 358/75
[58] Field of Search .................. 358/75, 78, 80

[56] References Cited

U.S. PATENT DOCUMENTS

| | | | |
|---|---|---|---|
| 4,533,928 | 8/1985 | Sugiura et al. | 358/80 |
| 4,584,601 | 4/1986 | Suzuki et al. | 358/80 |
| 4,631,578 | 12/1986 | Sasaki et al. | 358/80 |
| 4,642,681 | 2/1987 | Ikeda | 358/75 |
| 4,643,563 | 2/1987 | Sayanagi | 358/80 |
| 4,672,393 | 6/1987 | Uchikata et al. | 346/76 PH |
| 4,682,216 | 7/1987 | Sasaki et al. | 358/80 |
| 4,796,086 | 1/1989 | Ohta et al. | 358/80 |

FOREIGN PATENT DOCUMENTS

| | | | |
|---|---|---|---|
| 0084228 | 7/1983 | European Pat. Off. | 358/80 |
| 3214125 | 3/1983 | Fed. Rep. of Germany . | |
| 3241768 | 5/1983 | Fed. Rep. of Germany . | |
| 3333801 | 3/1984 | Fed. Rep. of Germany . | |
| 60-10251 | 1/1985 | Japan | 358/80 |
| 60-46574 | 8/1985 | Japan | 358/80 |
| 60-148278 | 8/1985 | Japan | 358/80 |
| 60-216670 | 10/1985 | Japan | 358/80 |
| 60-220660 | 11/1985 | Japan | 358/80 |
| 60-249470 | 12/1985 | Japan | 358/80 |

OTHER PUBLICATIONS

Hiroaki Kotera, "Tone and Color Reproduction Method for Hard-Copy Printer", The Journal of the Institute of Television Engineers of Japan, vol. 37, No. 7 (1983), pp. 546-552.

Primary Examiner—James J. Groody
Assistant Examiner—Randall S. Svihla
Attorney, Agent, or Firm—Andrus, Sceales, Starke & Sawall

[57] ABSTRACT

A color correcting circuit for thermal printer comprises a first circuit for obtaining a first degree correction operation result, a second circuit for obtaining a second degree correction operation result, and a difference limiting circuit for selectively outputting a correction data. The first degree correction operation makes the relationship between the density of an input image and the density of an output image linear for each primary color. The second degree correction operation reduces a difference between the density of the input image and the density of the output image by use of the method of least squares for each primary color. The difference limiting circuit selectively outputs as the correction data the second degree correction operation result when a difference between the first and second degree correction operation results falls within a predetermined range of a boundary value, and selectively outputs as the correction data a value which is deviated from the first degree correction operation result by the boundary value when the difference falls outside the predetermined range of the boundary value. The color correction of the input image is carried out based on the correction data outputted from the difference limiting circuit.

4 Claims, 3 Drawing Sheets

COLOR CORRECTING CIRCUIT FOR THERMAL PRINTER SELECTIVELY OUTPUTTING A SECOND DEGREE CORRECTION OPERATION RESULT AND A MODIFIED RESULT THEREOF

BACKGROUND OF THE INVENTION

The present invention generally relates to color correcting circuits for thermal printers, and more particularly to a color correcting circuit for thermal printer capable of carrying out a true color reproduction of an input image by correcting a mixing ratio of primary color inks when printing a color image.

Recently, thermal printers have been developed for printing color images based on graphic image outputs of computers, personal computers and the like. The thermal printer uses a polyester ink film having a film thickness of 5 $\mu$m to 6 $\mu$m, for example, and this ink film is coated on a front side thereof with ink of three primary colors, namely, yellow, magenta and cyan. The yellow, magenta and cyan inks are successively coated on the front side of the ink film for predetermined lengths each, and such successive coating is repeated. The ink coated on the ink film may be of a type which melts due to heat or a type which sublimates due to heat. The front side of the ink film is positioned to make contact with a recording paper, and a thermal printing head makes contact with a back side of the ink film. A current is applied to the thermal printing head, and the ink at a portion of the ink film corresponding to the location of the thermal printing head is transferred onto the recording paper by being melted or sublimated. The thermal printing head generally comprises a plurality of heating resistors arranged in a line, and the current is successively applied to the heating resistors depending on data of the image which is to be printed.

Accordingly, in the case where the recording paper is fixed on a platen roller, the printing is carried out with the color yellow in one revolution of the platen roller, for example, and the printing is similarly carried out with the colors magenta and cyan during respective two revolutions of the platen roller. Hence, the printing of the color image on the recording paper may be completed in three revolutions of the platen roller.

In order to compensate for a difference in the characteristic of a color separation system of an image input apparatus such as a television camera and the characteristic of a color mixing system of a color television monitor or the like so as to carry out a true color reproduction of the input image in the output image which is printed, a color correction (or masking) is generally carried out by a first degree operation process described by equation (1).

$$Y_1 = k_{11}X_1 + k_{12}X_2 + k_{13}X_3$$
$$Y_2 = k_{21}X_1 + k_{22}X_2 + k_{23}X_3 \quad (1)$$
$$Y_3 = k_{31}X_1 + k_{32}X_2 + k_{33}X_3$$

In equation (1), $(X_1, X_2, X_3)$ denote color separated input signals of the three primary colors, such as the three primary color signals of red, green and blue of the additive primaries, and $(Y_1, Y_2, Y_3)$ denote color separated output signals of the three primary colors after the color correction. In addition, $k_{11}$ through $k_{13}$, $k_{21}$ through $k_{23}$ and $k_{31}$ through $k_{33}$ denote predetermined correction coefficients. By use of equation (1), it is possible to vary the degree of color mixture and obtain a satisfactory color reproduction.

Next, a description will be given on the case where the image output apparatus is a thermal printer using color inks which employ as the coloring material dye, pigment or the like of three primary colors of yellow, magenta and cyan which are complementary colors of the three primary colors of red, green and blue. In this case, the compensation of the characteristic of the color mixing system using the color inks is extremely complicated compared to that of the color television monitor or the like for the reasons which will be described later.

In the present specification, the three additive primary colors of red, green and blue will hereinafter simply be referred to as RGB. Similarly, the three subtractive primary colors of yellow, magenta and cyan will hereinafter simply be referred to as YMC.

FIG. 1 shows examples of the spectral reflectance characteristics of the color inks of YMC. When printing a color image, the main cause which prevents the true color reproduction of the original color document (that is, the input image) is the coloring material. In other words, the true color reproduction of the input image is mainly prevented because the spectral reflectance characteristics of the color inks are greatly deviated from the ideal spectral reflectance characteristics. For example, the yellow ink has a spectral reflectance characteristic approximating the ideal characteristic, but the magenta and cyan inks have spectral reflectance characteristics greatly deviated from the respective ideal characteristics. For this reason, it is necessary to carry out the color correction in the thermal printer so as to compensate for the deviation from the ideal characteristics.

On the other hand, FIG. 2 shows an example of a CIE-xy chromaticity diagram. In FIG. 2, a range indicated by a one-dot chain line I shows the color reproduction range of the color television monitor, a range indicated by a phantom line II shows the color reproduction range of the thermal printer which uses the color inks. As may be seen from FIG. 2, the color reproduction range of the color television monitor is large compared to that of the thermal printer, and it is possible to obtain in the color television monitor an output image having a richer perceived color. For example, the three primary colors of RGB in the color television system are described by the three primary colors of YMC in the thermal printer by overlapping the color inks, where $R = Y + M$, $G = Y + C$ and $B = M + C$.

But the spectral reflectance characteristics of YMC shown in FIG. 1 are not ideal characteristics such that only predetermined wavelengths are absorbed and the other wavelengths reflected, and the spectral reflectance characteristics include undesirable color mixing. In addition, because the color reproduction using the color inks includes non-linear elements, it is possible to obtain only a poor color reproduction when the colors are simply overlapped, and the effect of the color correction using the first degree operation process described before is insufficient.

In order to improve this insufficient color correction, a color correcting circuit of the conventional thermal printer carries out a color correction using a second degree operation process such as that proposed in The Journal of the Institute of Television Engineers of Japan, Vol. 37, No.7 (1983), pp.546–552 (hereinafter simply referred to as Journal). In this Journal, the color correction uses a non-linear masking described particularly on p.550. According to this proposed color correction, a difference between the input image and the output image is reduced by using the method of least squares. The color reproduction in the output image within the reproducible range of the color inks is improved by expanding equation (1) to the second degree terms as shown in equation (2), where ($a_{ij}$) denotes a coefficient matrix of the correction coefficients, i=1 to 3 and j=1 to 10.

$$\begin{pmatrix} Y_1' \\ Y_2' \\ Y_3' \end{pmatrix} = (a_{ij}) \begin{pmatrix} X_1 \\ X_2 \\ X_{32} \\ X_{12} \\ X_{22} \\ X_3 \\ X_1X_2 \\ X_2X_3 \\ X_3X_1 \\ 1 \end{pmatrix} \quad (2)$$

However, in the color correcting circuit of the conventional thermal printer, when the input RGB signals of the color television monitor are used as the color separated input signals, for example, the color reproduction cannot be carried out with the color inks in a range III shown in FIG. 2 which is within the color reproduction range I of the color television system but is outside the color reproduction range II of the color inks. When equation (2) is applied as it is to the range III in which the color reproduction is not possible by use of the color inks, an extreme change may occur in the hue, and such application of equation (2) is impractical in this case.

In other words, as stated in the Journal, an approximating equation is obtained by the method of least squares between the color separated input signals of the thermal printer and the printed output so as to obtain a satisfactory color reproduction, but the approximating equation cannot be applied to the color input signals in the range outside the color reproduction range of the color inks.

It will be assumed for convenience' sake that $X_2 \simeq 0$ and $X_3 \simeq 0$ in equations (1) and (2). In this case, the relationship between the color separated input signal $X_1$ and the color separated output signal $Y_1$ becomes a linear characteristic k shown in FIG. 3 according to the first degree operation process of equation (1), while the relationship becomes a non-linear characteristic l shown in FIG. 3 according to the second degree operation process of equation (2).

The characteristic l is obtained by looking only within the color reproduction range II of the color inks, and a hatched portion A shows an example of a portion where a change in the color output is non-uniform with respect to the color input existing outside the color reproduction range II.

The colors which are printed and reproduced are described by overlapping the color separated input signals $X_1$, $X_2$ and $X_3$. Generally, when a color of high saturation exceeds the color reproduction range of the color inks, either the level of one color in the color separated input signals $X_1$ through $X_3$ is extremely high compared to the other color components, or the level of one color in the color separated input signals $X_1$ through $X_3$ is extremely low compared to the other color components. For example, in the former case, the operation result of the second degree correction (hereinafter simply referred to as a second degree correction operation result) becomes abnormal as indicated by the hatched portion A on the characteristic l in FIG. 3, and a correct color reproduction cannot be achieved when a color correction is carried out based on the second degree correction operation result.

For example, it is possible to conceive a method of obtaining an approximating equation for carrying out the color correction uniformly within the color reproduction range I of the color television system shown in FIG. 2. However, when the color correction is carried out based on such an approximating equation, it is impossible to obtain a satisfactory approximation because the reproduction error occurs differently within and outside the color reproduction range II of the color inks.

On the other hand, it is also possible to consider a method of calculating before the printing the positions of the colors corresponding to the color separated input signals on the x-y coordinate shown in FIG. 2, and changing the approximating equation based on the calculated positions on the x-y coordinate. But in order to carry out the calculation at a high speed by use of a random access memory (RAM), for example, it is necessary to have a parallel input of 18 ($=6\times3$) bits when the gradation level of each color is described in 6 bits, for example. As a result, the RAM must be a large scale memory of 6 ($\simeq 2^{18}\times 8\times 3$) Mbits, and there is a problem in that this method is impractical from this point of view.

SUMMARY OF THE INVENTION

Accordingly, it is a general object of the present invention to provide a novel and useful color correcting circuit for thermal printer, in which the problems described heretofore are eliminated.

Another and more specific object of the present invention is to provide a color correcting circuit for thermal printer, in which a color correction is carried out by selectively using one of a first degree correction operation result or a second degree correction operation result based on the second degree correction operation result. According to the color correcting circuit of the present invention, it is possible to carry out a highly accurate color correction by the second degree correction operation while automatically compressing by use of the first degree correction operation result color separated input signals outside a color reproduction range of color inks. Hence, an extreme change in hue can be prevented from being generated, and it is possible to satisfactorily reproduce the colors such that the colors of high saturation are maintained natural.

Still another object of the present invention is to provide a color correcting circuit for thermal printer comprising a first circuit for obtaining a first degree correction operation result by a first degree correction operation, a second circuit for obtaining a second degree correction operation result by a second degree correction operation, and a difference limiting circuit for selectively outputting a correction data. The first degree correction operation makes the relationship between the density of an input image and the density of an output image linear for each primary color. The second degree correction operation reduces a difference between the density of the input image and the density of the output image by use of the method of least squares for each primary color. The difference limiting circuit selectively outputs as the correction data the second degree correction operation result when a difference between the second degree correction operation result and the first degree correction operation result falls within a predetermined range of a boundary value, and selectively outputs as the correction data a value which is deviated from the first degree correction operation result by the boundary value when the difference between the second degree correction operation result and the first degree correction operation result falls outside the predetermined range of the boundary value. The color correction of the input image is carried out based on the correction data outputted from the difference limiting circuit.

Other objects and further features of the present invention will be apparent from the following detailed description when read in conjunction with the accompanying drawings.

DETAILED DESCRIPTION

Figure 4:
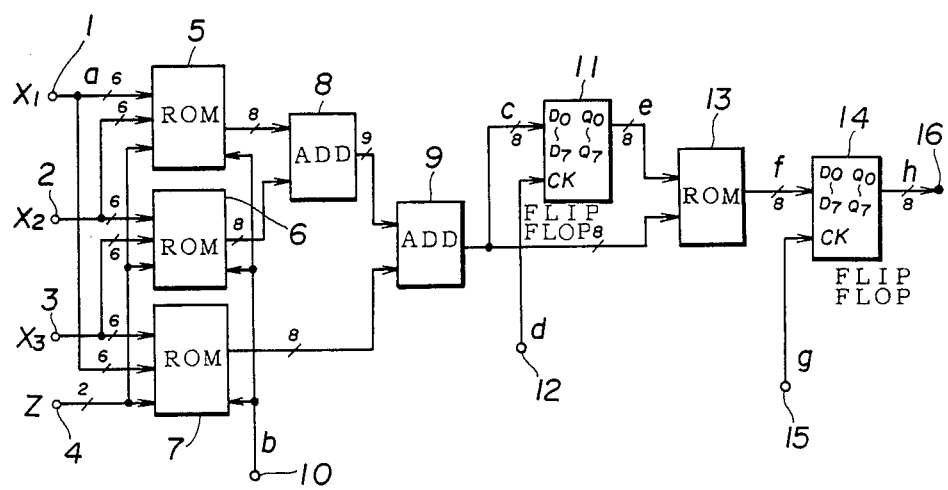
FIG. 4 is a system block diagram showing an embodiment of the color correcting circuit according to the present invention.
Figure 5:
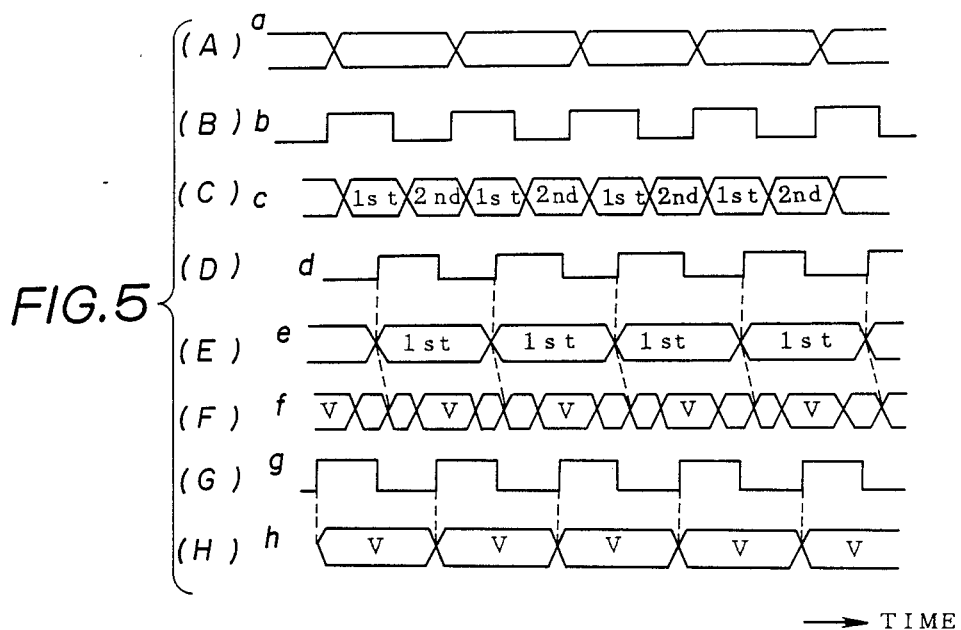
FIGS. 5(A) through 5(H) are timing diagrams for explaining the operation of the embodiment.

FIG. 4 shows an embodiment of the color correcting circuit for thermal printer according to the present invention. Color separated input signals $X_1$, $X_2$ and $X_3$ corresponding to the three primary colors RGB are simultaneously applied to terminals 1, 2 and 3, respectively. For example, the color separated input signals $X_1$, $X_2$ and $X_3$ are obtained from a color separation system of an image input apparatus such as a television camera. The color separated input signals $X_1$, $X_2$ and $X_3$ have a timing as shown in FIG. 5(A). A 2-bit color selection signal Z is applied to a terminal 4. The color selection signal Z determines the value of i in the coefficient matrix $(a_{ij})$ of the correction coefficients in equation (2) described before. In this case, the thermal color printing is carried out for each color in sequence plane by plane. Hence, in the present embodiment, the color correction and the conversion of the signals of the three primary colors of RGB into signals of the three primary colors of YMC are carried out simultaneously, and color separated output signals $Y_1$, $Y_2$ and $Y_3$ (or $Y_1'$, $Y_2'$ and $Y_3'$) corresponding to the three primary colors of RGB must be outputted sequentially plane by plane and not at the same time. For this reason, the value of the color selection signal Z also changes sequentially as "1", "2" and "3", for example.

On the other hand, read only memories (ROMs) 5 through 7 function as table memories for carrying out the first and second degree correction operation processes together with adders 8 and 9. The ROMs 5 through 7 pre-store operation results between correction coefficients and the input signals $X_1$ through $X_3$ applied at the address terminal thereof. In addition, a switching signal b shown in FIG. 5(B) is applied to a terminal 10 and is supplied to the ROMs 5 through 7 to be used for switching between the first and second degree correction operations. The ROMs 5 through 7 output the first degree correction operation result during a high-level period of the switching signal b and output the second degree correction operation result during a low-level period of the switching signal b.

First, a description will be given for the case where the switching signal b has a high level and the first degree correction operation process is carried out. In this case, the color selection signal Z first takes the value "1", and the ROM 5 outputs a multiplication result $k_{11}X_1$ of the incoming input signal $X_1$ and the correction coefficient $k_{11}$. Similarly, the ROMs 6 and 7 output multiplication results $k_{12}X_2$ and $k_{13}X_3$, respectively.

The adder 8 adds the multiplication results $k_{11}X_1$ and $k_{12}X_2$ from the ROMs 5 and 6, and the adder 9 adds an output added result from the adder 8 and the output multiplication result $k_{13}X_3$ from the ROM 7. Thus, an output signal $Y_1$ ($=k_{11}X_1+k_{12}X_2+k_{13}X_3$) of equation (1) described before is obtained from the adder 9.

Similarly, when the color selection signal Z takes the value "2", multiplication results $k_{21}X_1$, $k_{22}X_2$ and $k_{23}X_3$ are selectively outputted from the ROMs 5 through 7, and an output signal $Y_2$ ($=k_{21}X_1+k_{22}X_2+k_{23}X_3$) is obtained from the adder 9. Furthermore, when the color selection signal Z takes the value "3", multiplication results $k_{31}X_1$, $k_{32}X_2$ and $k_{33}X_3$ are selectively outputted from the ROMs 5 through 7, and an output signal $Y_3$ ($=k_{31}X_1+k_{32}X_2+k_{33}X_3$) is obtained from the adder 9. Hence, the output signals $Y_1$, $Y_2$ and $Y_3$ which are first degree correction operation result based on equation (1) are obtained successively.

Next, a description will be given for the case where the switching signal b has a low level and the second degree correction operation process is carried out. The ROMs 5 through 7 pre-store in addition to the operation results for the first degree correction operation process intermediate operation results for the second degree correction operation process. Hence, when the switching signal b has the low level, the intermediate operation results for the second degree correction operation process are selectively outputted from the ROMs 5 through 7. In other words, the ROM 5 pre-stores addition results of products of 12 correction coefficients $a_{i1}$, $a_{i4}$, $a_{i7}$ and $a_{i10}$ out of a total of 30 correction coefficients $a_{i1}$ through $a_{i10}$ for the second degree correction operation process and $X_1$, $X_1^2$, $X_1X_2$ and 1, where i=1 to 3, independently for each value of i. Similarly, the ROM 6 pre-stores addition results of products of 9 correction coefficients $a_{i2}$, $a_{i5}$ and $a_{i8}$ and $X_2$, $X_2^2$ and $X_2X_3$, and the ROM 7 pre-stores addition results of products of 9 correction coefficients $a_{i3}$, $a_{i6}$ and $a_{i9}$ and $X_3$, $X_3^2$ and $X_3X_1$, independently for each value of i.

When the color selection signal Z takes the value "1", the operation result for i=1 is selected from the operation results pre-stored in the ROMs 5 through 7. Similarly, the operation result for i=2 is selected from the operation results pre-stored in the ROMs 5 through 7 when the color selection signal Z takes the value "2", and the operation result for i=3 is selected from the operation results pre-stored in the ROMs 5 through 7 when the color selection signal Z takes the value "3".

Accordingly, the ROM 5 outputs the operation result $(a_{i1}X_1+a_{i4}X_1^2+a_{i7}X_1X_2+a_{i10})$ in equation (2), the ROM 6 outputs the operation result $(a_{i2}X_2+a_{i5}X_2^2+a_{i8}X_2X_3)$, and the ROM 7 outputs the operation result $(a_{i3}X_3+a_{i6}X_3^2+a_{i9}X_3X_1)$. Therefore, the adder 9 outputs an output signal $Y_i'$ of equation (3).

$$Y_i' = a_{i1}X_1 + a_{i2}X_2 + a_{i3}X_3 + a_{i4}X_1^2 + a_{i5}X_2^2 + a_{i6}X_3^2 + a_{i7}X_1X_2 + a_{i8}X_2X_3 + a_{i9}X_3X_1 + a_{i10} \quad (3)$$

Since the value of i successively changes from "1" to "3" in this sequence, output signals $Y_1', Y_2'$ and $Y_3'$ are successively outputted from the adder 9. The second degree correction operation results based on equation (2) is obtained in this manner.

As shown in FIG. 5(B), the high-level period and the low-level period of the switching signal b are repeated with a predetermined interval. Hence, operation result data c comprising alternate repetition of the first and second degree correction operation results as shown in FIG. 5(C) are outputted from the adder 9, where "1st" denotes the first degree correction operation result and "2nd" denotes the second degree correction operation result.

Next, an edge triggered type D (delay) flip-flop 11 is operated responsive to a rise in a clock signal d shown in FIG. 5(D) from a terminal 12. In this case, the flip-flop 11 extracts only the first degree correction operation result (portion indicated by "1st") from the operation result data c, and supplies data e shown in FIG. 5(E) to a ROM 13.

Figure 1:
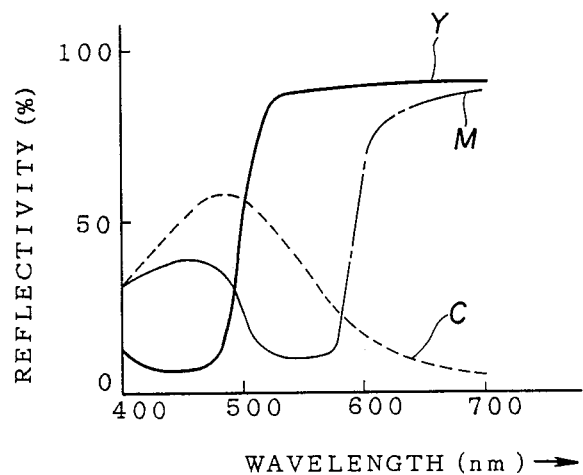
FIG. 1 shows spectral reflectance characteristics of color inks.
Figure 2:
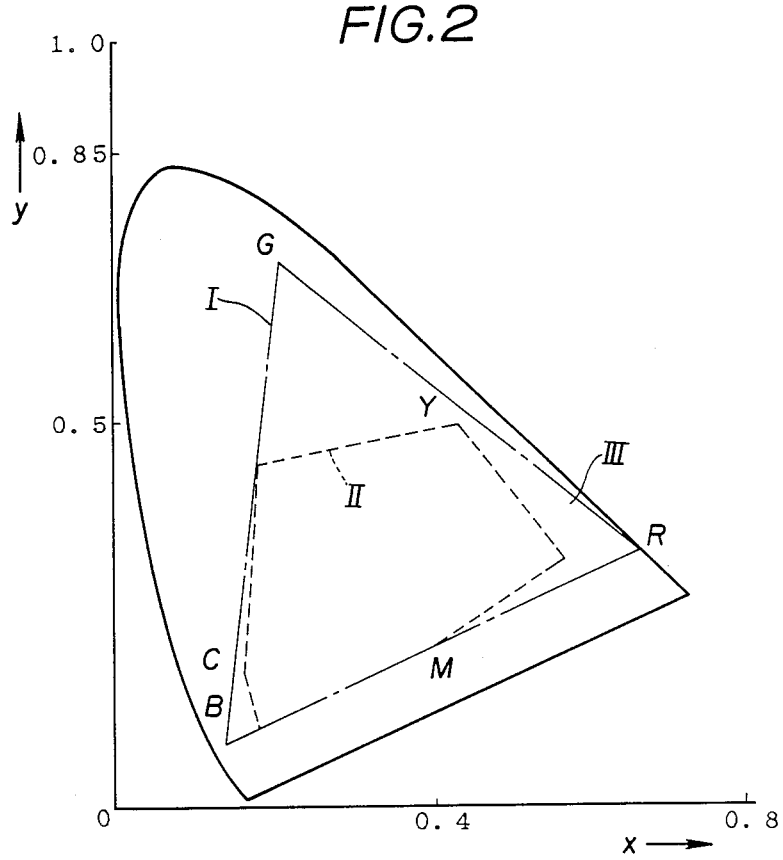
FIG. 2 shows a CIE-xy chromaticity diagram.
Figure 3:
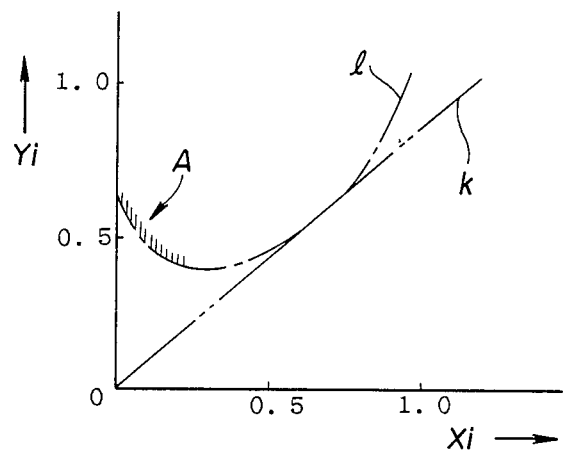
FIG. 3 shows an input versus output characteristic for explaining color correction based on first and second degree correction operations.
Figure 6:
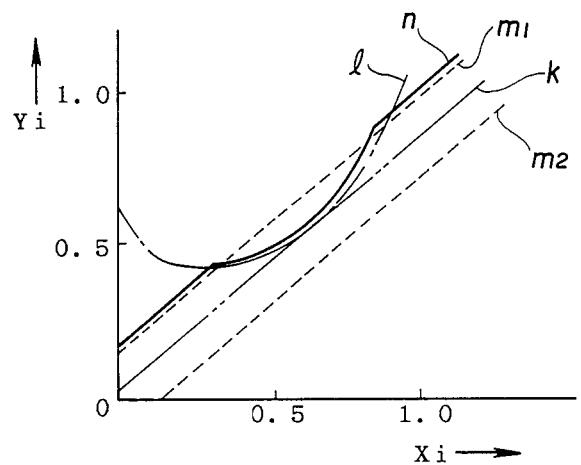
FIG. 6 shows an input versus output characteristic for explaining the operation of an essential part of the embodiment.

Next, a description will be given on the operation of the ROM 13 by referring to FIG. 6. In FIG. 6, those parts which are the same as those corresponding parts in FIG. 3 are designated by the same reference characters. The ROM 13 outputs predetermined correction data based on the second degree correction operation result, and boundary lines $m_1$ and $m_2$ are preset with a predetermined width (boundary value) about the characteristic k (first degree correction operation result). The boundary value is set to an optimum value obtained from experience. The ROM 13 selectively outputs as the correction data the second degree correction operation result when the value of the second degree correction operation result falls within the range of the boundary value. But when the value of the second degree correction operation result exceeds the range of the boundary value, the ROM 13 selectively outputs as the correction data the exceeded boundary value.

Accordingly, the correction data having a characteristic indicated by a solid line n in FIG. 6 is outputted from the ROM 13. For convenience' sake, the characteristic n and the characteristics l and $m_1$ are shown slightly deviated from one another, but these characteristic actually overlap in part.

Returning now to the description of FIG. 4, the ROM 13 uses the data e (based on the first degree correction operation result) from the flip-flop 11 and the operation result data c from the adder 9 as the address, and outputs output data f shown in FIG. 5(F). In this case, a portion indicated by "V" denotes the valid portion of the output data f, and this valid portion V corresponds to the correction data referred to before. At the valid portion V, the data based on the second degree correction operation result ("2st") out of the operation result data c and the data e based on the first degree correction operation result ("1st") are entered simultaneously into the ROM 13.

Next, a D flip-flop 14 extracts only the valid portion V (correction data) from the output data f responsive to a clock signal g shown in FIG. 5(G) which is received through a terminal 15, and supplies to an output terminal 16 correction data h shown in FIG. 5(H).

As described before, the correction data h is constituted by corrected data of each of the colors outputted sequentially based on the three primary colors of RGB. For example, when the second degree correction operation result is selected, data corresponding to the corrected output signals $Y_1', Y_2'$ and $Y_3'$ in equation (2) are outputted successively. The color printing is carried out based on the correction data h.

The correction based on the first degree correction operation result is not necessarily sufficient for the reasons described before, but the uniformity of the output is not lost with respect to the input because this correction is a linear conversion. In other words, there is no possibility of an extreme change in the hue. On the other hand, when the range of the boundary value is set about the first degree correction operation result as is done in the present embodiment, the case where the second degree correction operation result exceeds the range of the boundary value corresponds to the case where the color reproduction of the input color signal by the color inks is impossible as described before in conjunction with the hatched portion A in FIG. 3. In the present embodiment, the extreme change in the hue is prevented in such a case by using the boundary value. The reason for using the boundary value is to avoid a discontinuity in the color reproduction (operation result) at a switching point and to add the values in the second degree correction operation result to the first degree correction operation result. By taking such measures, it is possible to carry out the color correction for the entire color reproduction range about the accurate second degree correction operation.

In the described embodiment, the input signals $X_1$ through $X_3$ are 6-bit signals, and the selection signal Z is a 2-bit signal. The output signals of the ROMs 5 through 7 and 13, the output signal of the adder 9 and the output signal of the flip-flops 11 and 14 are 8-bit signals. The output signal of the adder 8 is a 9-bit signal. In addition, the switching signal b and the clock signals d and g are 1-bit signals. However, the number of bits of these signals are of course not limited to those of the embodiment.

In the embodiment, the ROMs 5 through 7 only require a memory capacity of 256 ($=2^6 \times 2^6 \times 2^3 \times 8$) kbits and the ROM 13 only requires a memory capacity of 512($=2^{16} \times 8$) kbits. In other words, the required memory capacity is considerably small compared to the 6 Mbits required in the conceivable method from the conventional case described before. Hence, a commonly available programmable ROM (PROM) may be used for the ROMs 5 through 7 and 13.

The first and second degree correction operation processes are not limited to those of equations (1) and (2) used in the embodiment.

Further, the present invention is not limited to these embodiments, but various variations and modifications may be made without departing from the scope of the present invention.

What is claimed is:

1. A color correcting circuit for a thermal printer for carrying out a predetermined color correction operation with respect to input signals of three additive primary colors related to an input image, the thermal printer printing an output image based on the predetermined color correction operation which is dependent on correction data by use of color inks of three subtractive primary colors, said color correcting circuit compensating for a difference in a characteristic of a color separation system from which the input signals are obtained and a characteristic of a color mixing system of the thermal printer so as to obtain an output image in which color reproduction is approximately the same as that in the input image, said color correcting circuit comprising:

first means for carrying out a first degree correction operation on the input signals for each additive primary color so that a ratio between a density of the input image and a density of the output image becomes linear, said first means outputting a first degree correction operation result which is an operation result of the first degree correction operation;

second means for carrying out a second degree correction operation on the input signals for each additive primary color by use of the method of least squares so that a difference between the density of the input image and the density of the output image is reduced when compared with the difference in the case where the second degree correction operation is not carried out, said second means outputting a second degree correction operation result which is an operation result of the second degree correction operation; and difference limiting means responsive to the first degree correction operation result and the second degree correction operation result for selectively outputting as the correction data the second degree correction operation result then a difference between the second degree correction operation result and the first degree correction operation result falls within a predetermined range about the first degree correction operation result, and for selectively outputting as the correction data a value which is deviated from the first degree correction operation result by a boundary value of said predetermined range when the difference between the second degree correction operation result and the first degree correction operation result falls outside said predetermined range, said color correcting circuit outputting output signals of the three subtractive primary colors describing the output image by carrying out the predetermined color correction operation based on the correction data outputted from said difference limiting means.

2. A color correcting circuit for a thermal printer as claimed in claim 1 in which said input signals are related to three additive primary colors of red, green and blue, and said output signals are related to three subtractive primary colors of yellow, magenta and cyan.

3. A color correcting circuit for a thermal printer as claimed in claim 1 in which the first means outputs signals described by the following equations as said first degree correction operation result:

$$Y_1 = k_{11}X_1 + k_{12}X_2 + k_{13}X_3$$

$$Y_2 = k_{21}X_1 + k_{22}X_2 + k_{23}X_3$$

$$Y_3 = k_{31}X_1 + k_{32}X_2 + k_{33}X_3$$

where $X_1$, $X_2$ and $X_3$ denote the input signals, $Y_1$, $Y_2$ and $Y_3$ denote the outpout signals, and $k_{11}$ through $k_{13}$, $k_{21}$ through $k_{23}$ and $k_{31}$ through $k_{33}$ denotes predetermined correction coefficients.

4. A color correcting circuit for a thermal printer as claimed in claim 1 in which the output signals are described by the following equation when said difference limiting means outputs said second degree correction operation result:

$$\begin{pmatrix} Y_1' \\ Y_2' \\ Y_3' \end{pmatrix} = (a_{ij}) \begin{pmatrix} X_1 \\ X_2 \\ X_{32} \\ X_{12} \\ X_{22} \\ X_3 \\ X_1X_2 \\ X_2X_3 \\ X_3X_1 \\ 1 \end{pmatrix}$$

where $X_1$, $X_2$ and $X_3$ denote the input signals, $Y_1'$, $Y_2'$, and $Y_3'$ denote the output signals, $(a_{ij})$ is a coefficient matrix of predetermined correction coefficients, $i = 1$ to 3, and $j = 1$ to 10.

* * * * *